US012799793B2

(12) United States Patent
Sun et al.

(10) Patent No.: US 12,799,793 B2
(45) Date of Patent: Nov. 17, 2026

(54) COVER ASSEMBLY

(71) Applicant: Illinois Tool Works Inc., Glenview, IL (US)

(72) Inventors: Yuan Sun, Shanghai (CN); Wenquan Sha, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 308 days.

(21) Appl. No.: 18/692,708

(22) PCT Filed: Mar. 29, 2023

(86) PCT No.: PCT/US2023/016765

§ 371 (c)(1),
(2) Date: Mar. 15, 2024

(87) PCT Pub. No.: WO2023/192404

PCT Pub. Date: Oct. 5, 2023

(65) Prior Publication Data

US 2024/0384585 A1 Nov. 21, 2024

(30) Foreign Application Priority Data

Mar. 31, 2022 (CN) ......................... 202210345377.5
Aug. 22, 2022 (CN) ......................... 202211016991.3

(51) Int. Cl.
*B60K 15/05* (2006.01)
*E05F 15/60* (2015.01)

(52) U.S. Cl.
CPC .............. *E05F 15/60* (2015.01); *B60K 15/05* (2013.01); *B60K 2015/0515* (2013.01);
(Continued)

(58) Field of Classification Search
None
See application file for complete search history.

(56) References Cited

U.S. PATENT DOCUMENTS 8,089,228 B2 * 1/2012 Ballard .................. B60K 15/05
73/1.03
10,052,947 B2 * 8/2018 Herrmann .............. B60K 15/05
10,577,845 B2 3/2020 Herczeg

FOREIGN PATENT DOCUMENTS

DE 4440814 A1 * 5/1996 ............. B60K 15/05
DE 202018106081 U1 11/2018
(Continued)

OTHER PUBLICATIONS

English language translation of DE 4440814 (Year: 1996).*
International Search Report and Written Opinion for PCT Patent Application No. PCT/US2023/16765 mailed Jul. 20, 2023.

*Primary Examiner* — Joseph D. Pape
(74) *Attorney, Agent, or Firm* — McAndrews, Held & Malloy, Ltd.

(57) ABSTRACT

The present application relates to a cover assembly including a housing, a cover, and a drive assembly. The housing has an accommodation space. The cover is movable relative to the housing and has a closed position and an open position, the cover closing a door plate opening on a door plate when the cover is in the closed position; and the cover is accommodated in the accommodation space and exposes the door plate opening when the cover is in the open position. A first end of the drive assembly can move linearly in a first direction, a second end of the drive assembly can be rotatably connected to a first end of the cover, the housing defines a first guide portion and a second guide portion, the first end of the cover can move along the first guide portion, and a second end of the cover can move along the second guide portion. The cover assembly of the present application can drive the cover to move through a drive device with a simple structure. Further, the cover of the present application can enable holding (self-locking) or opening (emergency
(Continued)

opening) of the cover according to requirements of different holding forces of different customers.

19 Claims, 16 Drawing Sheets

(52) U.S. Cl.
CPC . *B60K 2015/0523* (2013.01); *E05Y 2201/684* (2013.01); *E05Y 2900/534* (2013.01)

(56) References Cited

FOREIGN PATENT DOCUMENTS

| | | | |
|---|---|---|---|
| DE | 102017212397 | B4 | 9/2020 |
| JP | H07270082 | A | 10/1995 |

* cited by examiner

COVER ASSEMBLY

This application is a 371 of International Patent Application No. PCT/US23/16765, filed Mar. 29, 2023, which claims benefit of Chinese Patent Application No. CN 202210345377.5, filed to the China Patent Office on Mar. 31, 2022, and which claims benefit of Chinese Patent Application No. CN 202211016991.3, filed to the China Patent Office on Aug. 22, 2022, entitled “Cover Assembly,” contents of all of which are hereby incorporated by reference in their entirety.

TECHNICAL FIELD

The present application relates to a cover assembly, and in particular, to a cover apparatus for covering a fuel tank area and/or a charging port area and/or a door handle area and/or a loading recess area of an automobile.

BACKGROUND

A cover assembly of an object includes a housing, a cover, and a drive assembly. The movement direction of an end of the drive assembly connected to a drive apparatus needs to change to drive the cover relative to a door plate to close or expose an opening on the door plate. However, such arrangement can make the specific setting of the drive apparatus more complex.

SUMMARY

The purpose of the present application is to at least partially address the above technical issues. The present application provides a cover assembly including a housing, a cover, and a drive assembly. The housing has an accommodation space. The cover is movable relative to the housing and has a closed position and an open position, the cover closing a door plate opening on a door plate when the cover is in the closed position; and the cover is accommodated in the accommodation space and exposes the door plate opening when the cover is in the open position. A first end of the drive assembly can move linearly in a first direction, a second end of the drive assembly can be rotatably connected to a first end of the cover, the housing defines a first guide portion and a second guide portion, the first end of the cover can move along the first guide portion, and a second end of the cover can move along the second guide portion.

According to the cover assembly described above, the drive assembly is configured to: during rotation of the drive assembly around a second end of the drive assembly such that the cover moves from the closed position to the open position, enable the first end of the cover to move downward relative to the second end of the cover, so that the first end of the cover first exits the door plate opening, and then the second end of the cover exits the door plate opening.

According to the cover assembly described above, the drive assembly includes a drive block, a first end of the drive block is linearly movable in the first direction, and a second end of the drive block is the second end of the drive assembly. The housing also defines a drive guide portion extending in the first direction, where the first end of the drive block is accommodated in the drive guide portion and the second end of the drive block is accommodated in the first guide portion.

According to the cover assembly described above, the first guide portion includes a first guide portion first part and a first guide portion second part in communication, where the first guide portion first part is configured to: as the cover moves from the closed position to the open position, enable the second end of the drive block to move downward in the first guide portion first part, so that the first end of the cover moves away from the door plate opening, where the first guide portion second part is disposed in the first direction.

According to the cover assembly described above, the drive guide portion is disposed above the first guide portion second part and is disposed at a distance in the height direction from the first guide portion second part.

According to the cover assembly described above, the drive assembly includes a drive block and a guide member, a first end of the guide member is the first end of the drive assembly, a second end of the guide member is rotatably connected to a first end of the drive block, and a second end of the drive block is the second end of the drive assembly; and the first end of the guide member is accommodated in the first guide portion, and the guide member is movable in the first direction.

According to the cover assembly described above, the second end of the guide member and the first end of the drive block are not accommodated in the first guide portion.

According to the cover assembly described above, the cover assembly is configured to: when the cover is in the closed position, enable the range of the angle φ between the length direction of the drive block and the first direction to be: 80°<φ≤105°.

According to the cover assembly described above, the drive assembly includes a drive block, a first end of the drive block being the first end of the drive assembly, and the second end of the drive block being the second end of the drive assembly: wherein the first end of the drive block is accommodated in the first guide portion.

According to the cover assembly described above, the cover assembly is configured to: when the cover is in the closed position, enable the range of the angle φ between the length direction of the drive block and the first direction to be: 105°<Φ<160°.

The cover assembly of the present application can drive the cover to move through a drive device with a simple structure. Further, the cover of the present application can enable holding (self-locking) or opening (emergency opening) of the cover according to requirements of different holding forces of different customers.

The concepts, specific structures, and technical effects of the present application will be further explained below in conjunction with the appended drawings to fully understand the purpose, features, and effects of the present application.

BRIEF DESCRIPTION OF DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Various specific embodiments of the present application will be described below with reference to the attached drawings that form a part of the present specification. It should be understood that while terms denoting orientation, such as "front," "rear," "upper," "lower," "left," "right." etc., are used in the present application to describe various exemplary structural parts and elements of the present application, these terms are used herein for convenience of illustration only, and these terms are determined based on the exemplary orientations shown in the attached drawings. Since the examples disclosed in the present application may be disposed in different orientations, these terms denoting orientation are for illustrative purposes only and should not be considered as limiting.

The cover assembly mentioned in the present application may be applied to a variety of scenarios, such as: a scenario in which any one of a fueling port of a fuel-consuming vehicle, a charging port of a power-consuming vehicle, a door handle of a vehicle, a vehicle liquid filler, and/or the like has a cover covering a recess area of the vehicle, and the cover has an open state and a closed state. For brevity of description, the fueling/charging port of the vehicle is used as the application scenario below.

Figure 1A:
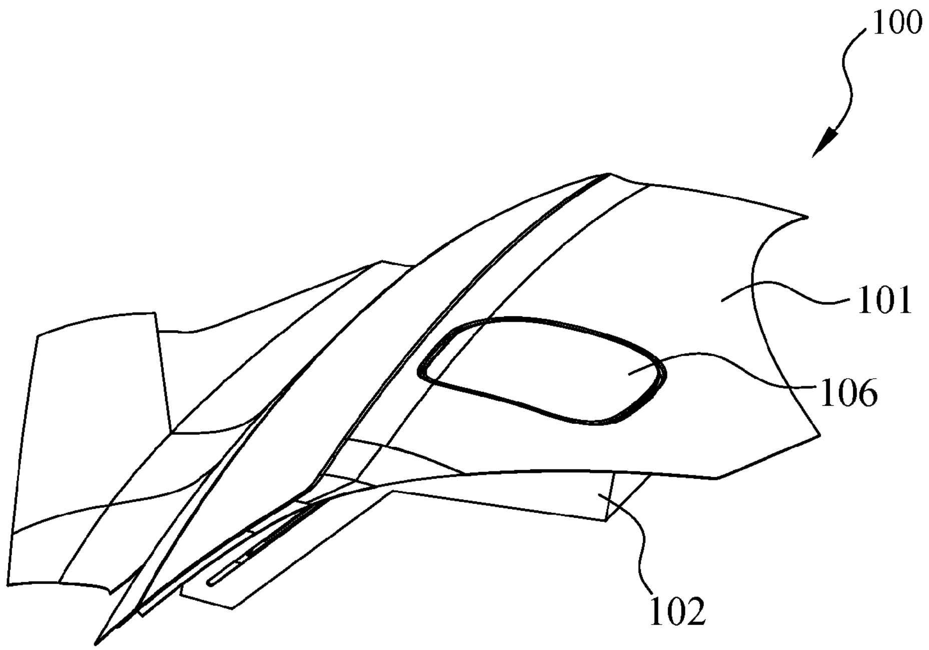
FIG. 1A is a perspective view of a cover assembly of a first example of the present application.

FIGS. 1A-4B illustrate a cover assembly 100 of a first example of the present application. FIG. 1A is a perspective view of the cover assembly 100 of the present application, and FIG. 1B is an exploded view of the cover assembly 100 shown in FIG. 1A. As shown in FIGS. 1A-1B, the cover assembly 100 includes a door plate 101, a housing 102, a cover 106, and a drive assembly. The door plate 101 is generally a thinner plate. In the present application, the door plate 101 includes a first door plate 121 and a second door plate 122. The first and second door plates 121, 122 are disposed at an angle. A door plate opening 103 is provided on the first door plate 121. The door plate opening 103 is disposed through the first door plate 121 in a top-to-bottom direction. The size of the cover 106 mates with the size of the door plate opening 103, thereby closing or exposing the door plate opening 103. The housing 102 is generally an upper open housing and defines an accommodation space 104. The cover 106 is connected to the housing 102 by the drive assembly and is movable relative to the housing 102. The drive assembly is capable of driving the cover 106 to move relative to the housing 102. The cover 106 has an open position and a closed position. When the cover 106 is in the closed position, the cover 106 can close the door plate opening 103; and when the cover 106 is in the open position, the cover 106 is accommodated in the accommodation space 104, exposing the door plate opening 103. In addition, the cover 106 can also be configured to: when the cover 106 is in the closed position, enable the outer surface (i.e., the front surface) of the cover 106 to be flush with the outer surface of the first door plate 121.

Figure 2A:
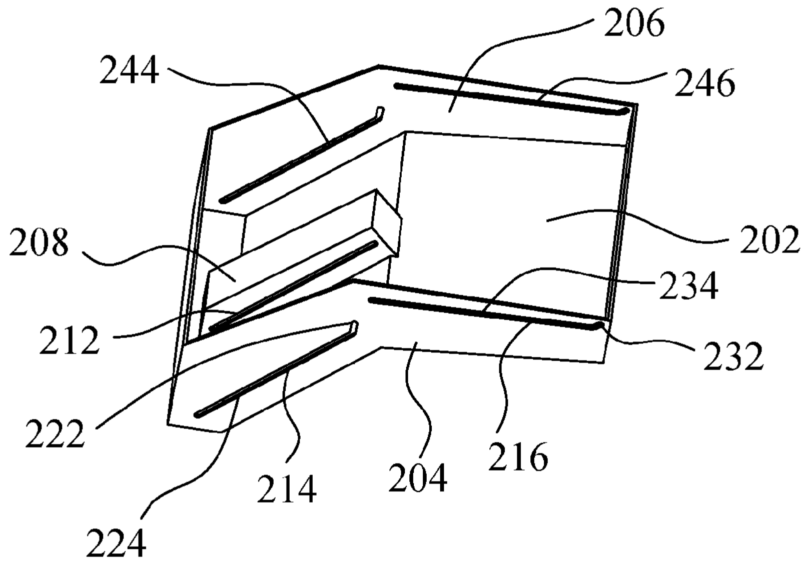
FIG. 2A is a perspective view of a first perspective of a housing shown in FIG. 1A.
Figure 2B:
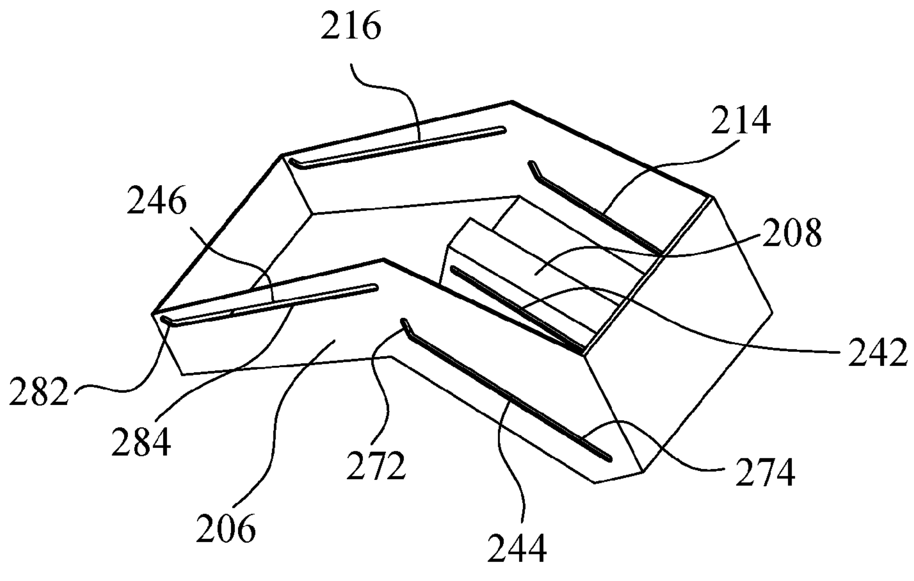
FIG. 2B is a perspective view of a second perspective of the housing shown in FIG. 1A.

FIG. 2A is a perspective view of a first perspective of the housing 102 shown in FIG. 1A, and FIG. 2B is a perspective view of a second perspective of the housing 102 shown in FIG. 1A. As shown in FIGS. 2A-2B, the housing 102 is generally box-like with an upper opening. The housing 102 includes a base plate 202, a front side plate 204, a rear side plate 206, and a support portion 208. The front side plate 204 and the rear side plate 206 are connected to the base plate 202 and disposed on opposite sides. The support portion 208 is disposed between the front side plate 204 and the rear side plate 206 and is connected to the base plate 202. The support portion 208 is formed by extending in the left-to-right direction. The housing 102 is provided with a drive guide portion 212, a first guide portion 214, and a second guide portion 216. The drive guide portion 212 and the first guide portion 214 are provided below the second door plate 122, and the second guide portion 216 is provided below the first door plate 121. In particular, the drive guide portion 212 is provided on the front side of the support portion 208. The drive guide portion 212 is disposed extending in the first direction. In the present application, the first direction is tilted to the plane in which the cover 106 in the closed position is located and is disposed substantially parallel to the plane in which the second door plate 122 is located. The first guide portion 214 and the second guide portion 216 are disposed on the front side plate 204. The first guide portion 214 is disposed generally on the front side of the drive guide portion 212, where the first guide portion 214 includes a first guide portion first part 222 and a first guide portion second part 224 in communication. The extension direction of the first guide portion first part 222 is perpendicular to the plane in which the cover 106 in the closed position is located. The first guide portion second part 224 is disposed extending in the first direction. The second guide portion 216 includes a second guide portion first part 232 and a second guide portion second part 234 in communication. The extension direction of the second guide portion first part 232 is tilted to the plane in which the cover 106 in the closed position is located. The second guide portion second part 234 is disposed along a second direction, and its extension direction is disposed slightly tilted to the plane in which the cover 106 in the closed position is located.

It should be noted that while both the drive guide portion 212 and the first guide portion second part 224 of the first guide portion 214 extend in the first direction, there is a distance between the drive guide portion 212 and the first guide portion second part 224 of the first guide portion 214 in the height direction (see two dash-dotted lines in FIG. 4A), and the drive guide portion 212 is located above the first guide portion second part 224.

As shown in FIGS. 2A-2B, the housing 102 also includes an auxiliary drive guide portion 242, a first auxiliary guide portion 244, and a second auxiliary guide portion 246. The auxiliary drive guide portion 242 and the first auxiliary guide portion 244 are provided below the second door plate 122, and the second auxiliary guide portion 246 is provided below the first door plate 121. In particular, the auxiliary drive guide portion 242 is provided on the rear side of the support portion 208 and is provided symmetrically with the drive guide portion 212. The auxiliary drive guide portion 242 is disposed extending in the first direction. The first and second auxiliary guide portions 244, 246 are disposed on the rear side plate 206 and are disposed symmetrically with the first and second guide portions 214, 216, respectively. The first auxiliary guide portion 244 is disposed generally on the rear side of the auxiliary drive guide portion 242, where the first auxiliary guide portion 244 includes a first auxiliary guide portion first part 272 and a first auxiliary guide portion second part 274 in communication. The extension direction of the first auxiliary guide portion first part 272 is perpendicular to the plane in which the cover 106 in the closed position is located, and the extension direction of the first auxiliary guide portion second part 274 is provided along the first direction. The second auxiliary guide portion 246 includes a second auxiliary guide portion first part 282 and a second auxiliary guide portion second part 284 in communication. The extension direction of the second auxiliary guide portion first part 282 is tilted to the plane in which the cover 106 in the closed position is located. The extension direction of the second auxiliary guide portion second part 284 is disposed slightly tilted to the plane in which the cover 106 in the closed position is located.

Figure 1B:
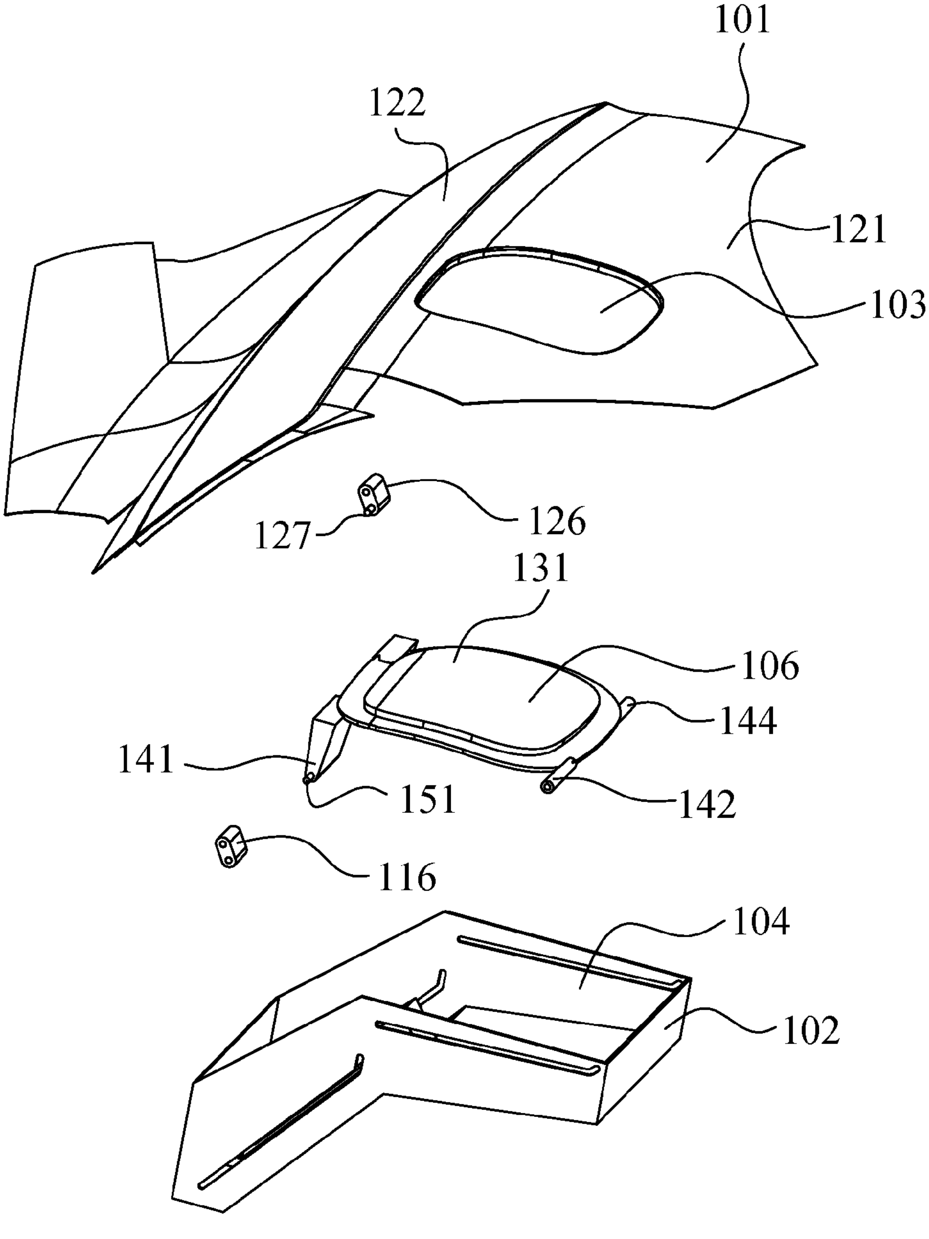
FIG. 1B is an exploded view of the cover assembly shown in FIG. 1A.

The cover 106 is described below with reference back to FIGS. 1A and 1B:

As shown in FIGS. 1A and 1B, the cover 106 includes a cover body 131, a first leg 141, a second leg 142, a third leg (not shown), and a fourth leg 144. The shape of the cover body 131 mates with the size of the door plate opening 103, thereby closing or exposing the door plate opening 103. The first leg 141 and the second leg 142 are disposed on the front side of the cover body 131, and the third leg and the fourth leg 144 are disposed on the rear side of the cover body 131, where the first leg 141 and the third leg are respectively provided at the left end (i.e., the first end) of the cover body 131 and are formed from the cover body 131 extending downward. The front side of the first leg 141 and the rear side of the third leg are respectively provided with a first leg guide rod 151 and a third leg guide rod (not shown) formed in the front-rear direction, which are accommodated in the first guide portion 214 and the first auxiliary guide portion 244, respectively, so that the first end of the cover body 131 can move relative to the housing 102 along the first guide portion 214. The second leg 142 and the fourth leg 144 are respectively provided at the right end (i.e., the second end) of the cover body 131 and are formed from the front side and the rear side of the cover body 131, respectively. The second leg 142 and the fourth leg 144 can be accommodated in the second guide portion 216 and the second auxiliary guide portion 246, respectively, so that the second end of the cover body 131 can move relative to the housing 102 along the second guide portion 216.

As shown in FIGS. 1A and 1B, the first end of the drive assembly can move linearly in the first direction, and the second end of the drive assembly can be rotatably connected to the first end of the cover 106. In the first example, the drive assembly includes a drive block 116 and an auxiliary transmission member 126. The drive block 116 is disposed between the first leg 141 and the support portion 208 and is rotatably connected to the first leg 141. The auxiliary transmission member 126 is disposed between the third leg and the support portion 208 and is rotatably connected to the third leg. In particular, a guide rod (not shown) is provided on the rear side of the first end (i.e., the lower end) of the drive block 116 and is accommodated in the drive guide portion 212 for linear movement in the first direction. The front side of the second end (i.e., the upper end) of the drive block 116 is rotatably connected to the rear side of the first leg 141 to achieve relative rotation of the drive block 116 with the first leg 141. Similarly, the front side of the first end (i.e., the lower end) of the auxiliary transmission member 126 is provided with an auxiliary guide rod 127 and accommodated in the auxiliary drive guide portion 242 for linear movement in the first direction. The second end (i.e., the upper end) of the auxiliary transmission member 126 is rotatably connected to the front side of the third leg to enable relative rotation of the auxiliary transmission member 126 with the third leg.

Figure 3A:
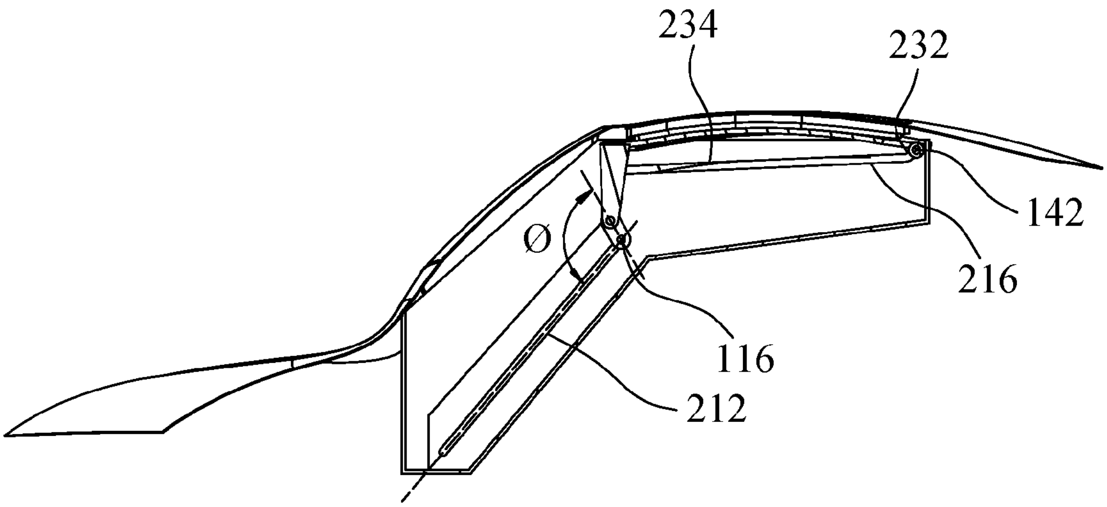
FIG. 3A is a cross-sectional view of the cover assembly shown in FIG. 1A with the cover in a closed position.
Figure 3B:
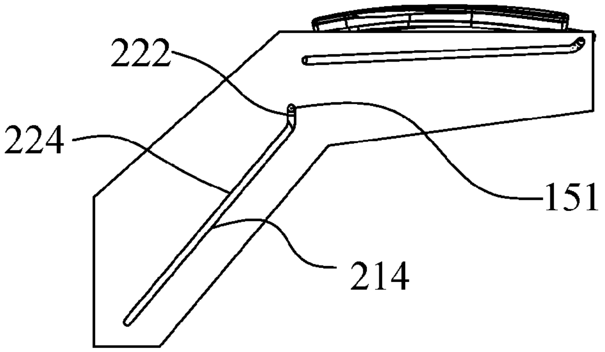
FIG. 3B is a side view of the cover assembly shown in FIG. 1A with the cover in a closed position and a door plate not shown.

FIG. 3A is a cross-sectional view of the cover assembly 100 shown in FIG. 1A with the cover 106 in the closed position. FIG. 3B is a perspective view of the cover assembly 100 shown in FIG. 1A with the door plate 101 not shown and the cover 106 in the closed position. As shown in FIGS. 3A-3B, when the cover 106 is in the closed position, the cover 106 closes the door plate opening 103, the guide rod of the drive block 116 is located at the right-most end of the drive guide portion 212, the second leg 142 is located at the right-most end of the second guide portion 216, and the first leg guide rod 151 is located at the upper-most end of the first guide portion 214. Accordingly, the auxiliary guide rod 127 of the auxiliary transmission member 126 is located at the right-most end of the auxiliary drive guide portion 242, the fourth leg 144 is located at the right-most end of the second auxiliary guide portion 246, and the third leg guide rod is located at the upper-most end of the first auxiliary guide portion 244. Furthermore, when the cover 106 is in the closed position, there is an angle $\varphi$ between the length direction of the drive block 116 and the first direction. The range of the angle q is: $80° < \varphi \le 105°$.

Figure 4A:
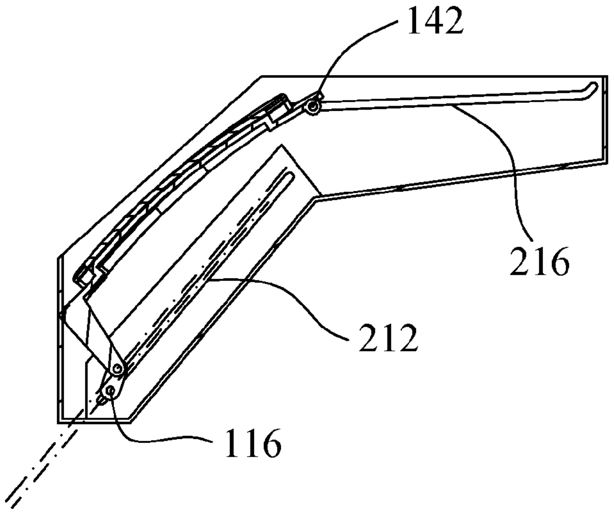
FIG. 4A is a cross-sectional view of the cover assembly shown in FIG. 1A with the cover in an open position and the door plate not shown.
Figure 4B:
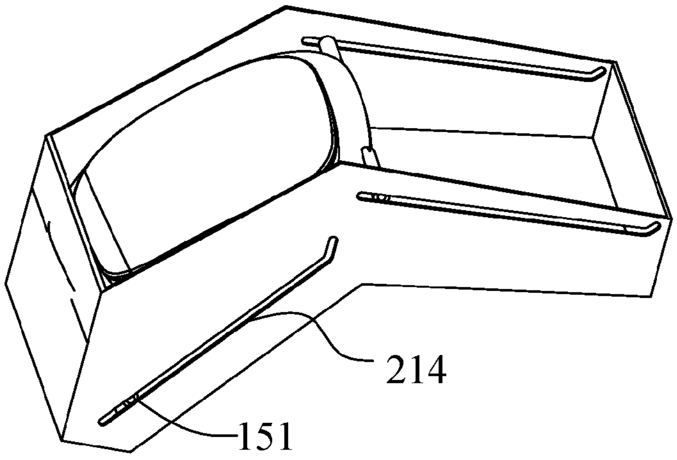
FIG. 4B is a perspective view of the cover assembly shown in FIG. 1A with the cover in an open position and the door plate not shown.

FIG. 4A is a cross-sectional view of the cover assembly 100 shown in FIG. 1A with the door plate 101 not shown and the cover 106 in the open position. FIG. 4B is a perspective view of the cover assembly 100 shown in FIG. 1A with the door plate 101 not shown and the cover 106 in the open position. When the cover 106 is in the open position, the cover 106 exposes the door plate opening 103, the guide rod of the drive block 116 is located at the left-most end of the drive guide portion 212, the second leg 142 is located at the left-most end of the second guide portion 216, and the first leg guide rod 151 is located at the lower-most end of the first guide portion 214. Accordingly, the auxiliary guide rod 127 of the auxiliary transmission member 126 is located at the left-most end of the auxiliary drive guide portion 242, the fourth leg 144 is located at the left-most end of the second auxiliary guide portion 246, and the third leg guide rod is located at the lower-most end of the first auxiliary guide portion 244.

The process of moving the cover 106 from the closed position to the open position is described below with reference to FIGS. 3A-3B and 4A-4B.

As shown in FIGS. 3A-3B, the cover 106 is in the closed position. When a driver needs to open the cover 106, the driver may drive the drive apparatus, thereby driving the first end of the drive block 116 and the first end of the auxiliary transmission member 126 to move diagonally downward in the first direction in the drive guide portion 212 and the auxiliary drive guide portion 242, respectively. The drive block 116 and the auxiliary transmission member 126 rotate about the first leg guide rod 151 and the third leg guide rod (i.e., the second end of the drive assembly), respectively, and then drive the first end of the cover 106 downward relative to the second end of the cover 106. Specifically, the first leg guide rod 151 and the third leg guide rod of the cover 106 move downward in the first guide portion first part 222 and the first auxiliary guide portion first part 272, respectively, causing the first end of the cover 106 to move downward away from the door plate opening 103. As the first end of the cover 106 moves downward away from the door plate opening 103, the second end of the cover 106 is also driven to move tilted downward away from the door plate opening 103. Specifically, the second leg 142 and the fourth leg 144 of the cover 106 move downward in the second guide portion first part 232 and the second auxiliary guide portion first part 282, respectively. Next, during movement of the first end of the drive block 116 and the first end of the auxiliary transmission member 126, the first leg guide rod 151 of the cover 106 enters the first guide portion second part 224 from the first guide portion first part 222 and moves downward in the first guide portion second part 224, and the third leg guide rod enters the first auxiliary guide portion second part 274 from the first auxiliary guide portion first part 272 and moves downward in the first auxiliary guide portion second part 274. Movement of the first leg guide rod 151 and the third leg guide rod drives the second leg 142 of the cover 106 to enter from the second guide portion first part 232 into the second guide portion second part 234 and move left in the second guide portion second part 234, and drives the fourth leg 144 of the cover 106 to enter from the second auxiliary guide portion first part 282 into the second auxiliary guide portion second part 284 and move left in the second auxiliary guide portion second part 284. As such, the first end of the cover 106 exits the door plate opening 103 first and the second end of the cover 106 exits the door plate opening 103. Finally, the cover 106 moves to the open position, exposing the door plate opening 103. At this point, the guide rod of the drive block 116 is located at the left-most end of the drive guide portion 212, the second leg 142 is located at the left-most end of the second guide portion 216, the first leg guide rod 151 is located at the lower-most end of the first guide portion 214, the auxiliary guide rod 127 of the auxiliary transmission member 126 is located at the left-most end of the auxiliary drive guide portion 242, the fourth leg 144 is located at the left-most end of the second auxiliary guide portion 246, and the third leg guide rod is located at the lower-most end of the first auxiliary guide portion 244.

The movement of the cover 106 from the open position to the closed position is opposite to the process described above from the closed position to the open position, which is not repeated here.

It is to be noted that although the auxiliary transmission member 126 moves with the drive block 116 in the present application, in other examples, the auxiliary transmission member 126 may not be provided and the auxiliary drive guide portion 242 is not provided on the housing 102 accordingly.

It should also be noted that although there are legs mated with the housing 102 at all four corners of the cover 106 in the present application, in other examples, there is only one leg mated with the housing 102 at the first end and the second end of the cover 106.

It should also be noted that although the first direction is tilted to the plane in which the cover 106 in the closed position is located in the present application, in other examples, the first direction may be set at any angle with the plane in which the cover 106 in the closed position is located.

It is also to be noted that although the first guide portion second part 224 and the first auxiliary guide portion second part 274 are respectively arranged extending in the first direction, those skilled in the art can understand that the first guide portion second part 224 and the first auxiliary guide portion second part 274 may not be arranged in a straight line, but rather in a curve or other shape, as long as their general arrangement direction can be compatible with the first direction, thereby causing the drive block 116 to move the cover 106.

It should also be noted that, although the first direction is tilted to the plane in which the cover 106 in the closed position is located in the present application, and is disposed generally parallel to the plane in which the second door plate 122 is located, in other examples, the first direction may be in any direction.

It should also be noted that although the extension direction of the first guide portion first part 222 in the present application is perpendicular to the plane in which the cover 106 in the closed position is located, in other examples, the first guide portion first part 222 is configured to: as the cover 106 moves from the closed position to the open position, enable the first end of the cover 106 to move away from and out of the door plate opening 103.

It is also to be noted that while the first guide portion 214 includes a first guide portion first part 222 and a first guide portion second part 224 in communication and the second guide portion 216 includes a second guide portion first part 232 and a second guide portion second part 234 in communication, the first guide portion first part 222 and the second guide portion first part 232 are provided in order to enable the cover 106 to move away from and out of the door opening 103 in the thickness direction of the door plate 101, provided that the door plate 101 has a certain thickness. Thus, in other examples, the first guide portion 214 may not include the first guide portion first part 222, and the second guide portion 216 may not include the second guide portion first part 232.

It should also be noted that although the extension direction of the second guide portion first part 232 in the present application is tilted to the plane in which the cover 106 in the closed position is located, in other examples, the second guide portion first part 232 is configured to: as the cover 106 moves from the closed position to the open position, enable the second end of the cover 106 to move away from and out of the door plate opening 103.

The first end of the drive assembly of the present application (i.e., the end of the drive assembly connected to the drive device) moves linearly, and the movement of the cover 106 can be driven, thereby enabling the opening and closing of the cover 106. As such, the drive apparatus can be achieved with a simple structure, such as a linear motor.

Further, in the prior art, when the cover is in the closed position, e.g., when the vehicle is being washed, the cover may be subjected to downward external force exerted by a driver. The inventors of the present application have found that this external force generally acts on the cover and is applied downward. This force will have a component in the movement direction of the cover, which will drive the cover to move, causing the cover to open by the external force. An additional locking apparatus is therefore required.

Figure 3C:
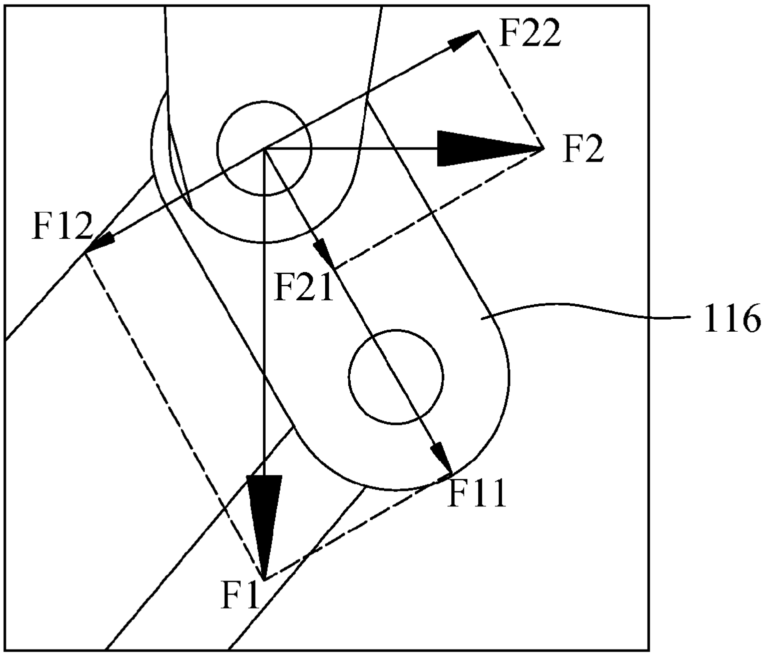
FIG. 3C is a force analysis diagram of an upper end of a drive block.

FIG. 3C is a force analysis diagram of the upper end of the drive block 116 when an external force is applied to the cover 106 and transferred to the drive block 116. In the present application, when an external force is applied to the cover 106 and transferred to the drive block 116, the external force is transferred from the cover 106 to the drive block 116. In this case, the upper end of the drive block 116 is subjected to a downward external force F. The external force F can be broken down into a force F11 along the length direction of the drive block 116 and a force F12 perpendicular to the length direction of the drive block 116. Since the upper end of the drive block 116 is accommodated in the first guide portion first part 222, the upper end of the drive block 116 is subject to a force F2 exerted on it by the left side wall of the first guide portion first part 222 perpendicular to the length direction (i.e., rightward) of the first guide portion first part 222. The force F2 can be broken down into a force F21 along the length direction of the drive block 116 and a force F22 perpendicular to the length direction of the drive block 116. The force F22 is opposite to the force F12 in direction and is equal in size to counteract each other. Both the force F11 and the force F21 are downward along the length direction of the drive block 116.

Figure 3D:
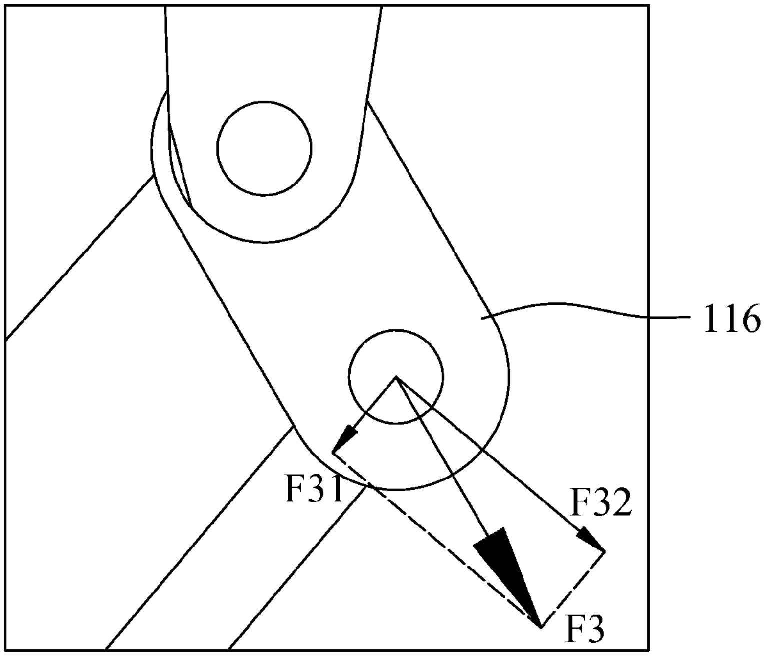
FIG. 3D is a force analysis diagram of a lower end of the drive block.

FIG. 3D is a force analysis diagram of the resultant force F3 of the force F11 and the force F21 shown in FIG. 3C against the lower end of the drive block 116. For ease of description, the force F11 and the force F21 shown in FIG. 3C are shown in a manner of the resultant force F3. As shown in FIG. 3D, the force F11 and the force F21 received at the upper end of the drive block 116 are applied at the lower end of the drive block 116, forming the downward resultant force F3 along the length direction of the drive block 116. The resultant force F3 can be broken down into a force F31 in the first direction (i.e., the length direction of the first guide portion second part 224) and a force F32 perpendicular to the first direction. The cover assembly 100 is configured to: when the cover 106 is in the closed position, enable the range of the angle φ between the length direction of the drive block 116 and the first direction to be: $80° < \Phi \leq 105°$ and thus the resultant force is broken into a smaller force F31 in the first direction and a larger force F32 perpendicular to the first direction. Since the lower end of the drive block 116 is accommodated in the first guide portion second part 224, the lower end of the drive block 116 is subjected to a force perpendicular to the first direction exerted by the lower side wall of the first guide portion second part 224, thereby being able to counteract with the force F32. The force F31 can be overcome by friction and/or resistance inside the drive apparatus. The friction is determined by the size of the force F32 and the friction factor of the lower end of the drive block 116 and the lower edge of the first guide portion second part 224. Due to the larger force F32, the friction that can be provided is also larger. As such, the cover 106 may be held in the closed position under the action of an external force, which does not require an additional locking apparatus to implement self-locking.

Moreover, in the present application, by specifically setting the angle between the set direction of the second guide portion 216 and the set direction of the drive guide portion 212 (e.g., the first direction is substantially parallel to the plane in which the second door plate 122 is located, and the extension direction of the second guide portion second part 234 is slightly tilted to the plane in which the cover 106 in the closed position is located), the cover assembly 100 of the present application can accommodate the door plate 101 that is shaped as a non-planar, and save the space occupied by the cover assembly 100 in the vehicle.

Figure 5A:
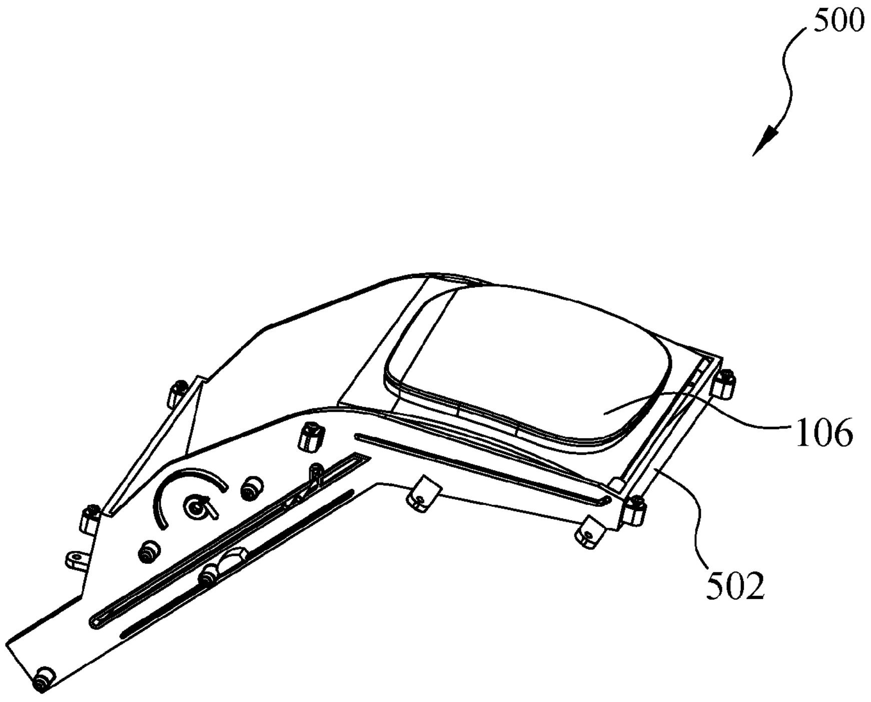
FIG. 5A is a perspective view of a cover assembly of a second example of the present application.
Figure 5B:
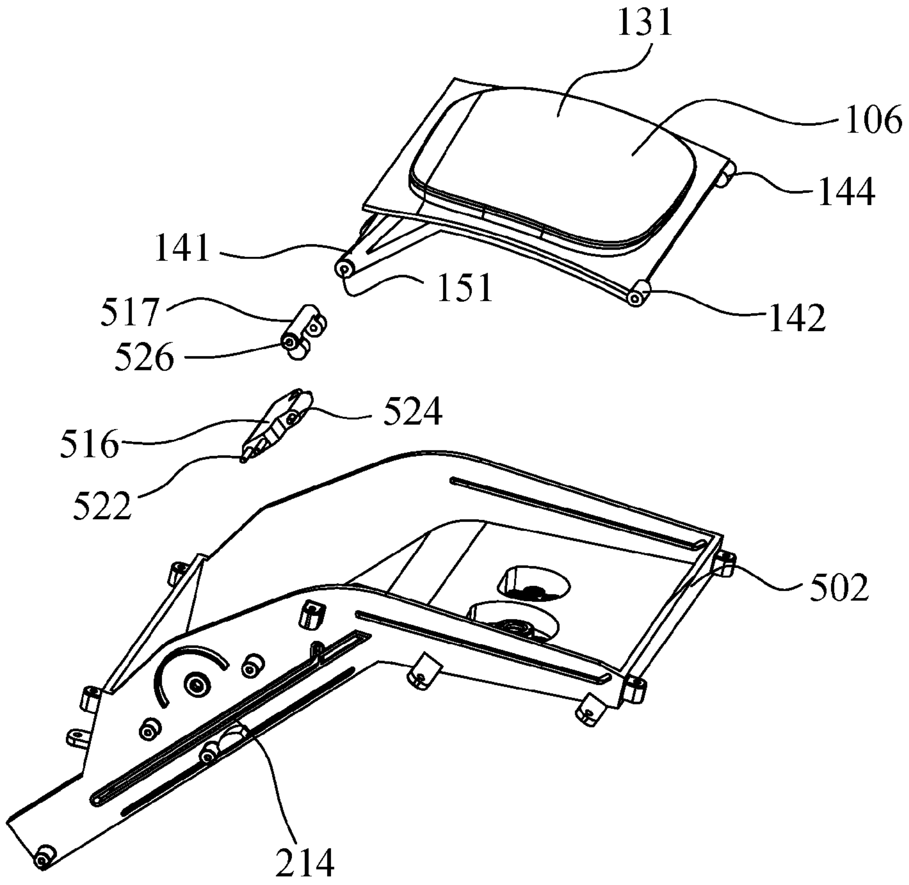
FIG. 5B is an exploded view of the cover assembly shown in FIG. 5A.
Figure 6:
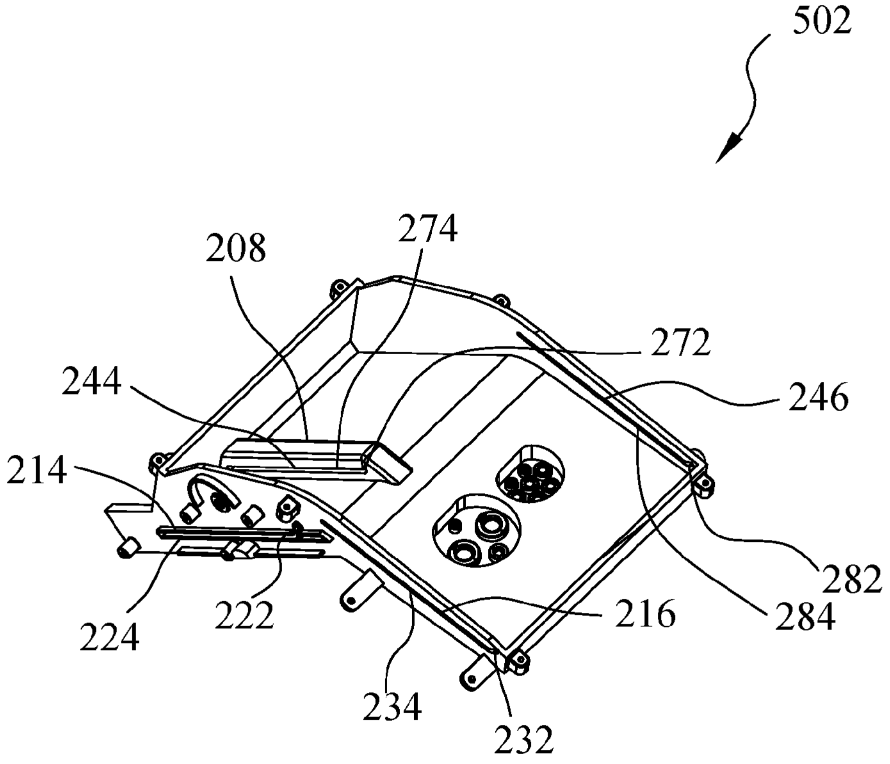
FIG. 6 is a perspective view of a housing shown in FIG. 5A.

FIGS. 5A-8B illustrate a cover assembly 500 of a second example of the present application. FIG. 5A is a perspective view of the cover assembly 500 of the present application, and FIG. 5B is an exploded view of the cover assembly 500 shown in FIG. 5A. FIG. 6 is a perspective view of a housing 502 shown in FIG. 5A. The main difference between the cover assembly 500 and the cover assembly 100 is that: The drive assembly in the cover assembly 500 includes a drive block 517 and a guide member 516, the drive guide portion 212 and the auxiliary drive guide portion 242 are not provided on the housing 502, and the first auxiliary guide portion 244 is provided on the support portion 208. Furthermore, the third leg of the cover assembly 100 is provided at the rear side of the cover body 131, while in the cover assembly 500, the third leg of the cover assembly 100 is provided at the first end of the cover body 131 and is provided in the middle in the front-to-rear direction. In other words, when the cover assembly 500 is fitted in place, the third leg of the cover assembly 100 is located between the front side plate 204 and the support portion 208. For the sake of brevity, the components in the cover assembly 500 are not described in the same parts as the components in the cover assembly 100, and the same components use the same names and reference numerals.

As shown in FIGS. 5A-5B, the drive assembly includes a drive block 517 and a guide member 516. The drive block 517 and the guide member 516 are disposed between the front side plate 204 and the support portion 208. The guide member 516 has a first end (i.e., a left end) and a second end (i.e., a right end). The first end of the guide member 516 is accommodated in the first guide portion 214. More specifically, the first end of the guide member 516 is accommodated in the first guide portion second part 224 of the first guide portion 214, and the guide member 516 is movable in the first direction. A first end (i.e., a lower end) of the drive block 517 is rotatably connected to the second end of the guide 516, and a second end (i.e., an upper end) of the drive block 517 is rotatably connected to the first leg 141 and the third leg of the cover 106. The first leg guide rod 151 of the first leg 141 and the third leg guide rod of the third leg are accommodated in the first guide portion 214 and the first auxiliary guide portion 244, respectively. The second end of the guide member 516 and the first end of the drive block 517 are not accommodated in the first guide portion 214.

As shown in FIG. 5B, as one example, in the present application, the guide member 516 is arranged extending in the first direction. The front and rear sides of the first end (i.e., the left end) of the guide member 516 are each provided with two guide rods 522 arranged in the first direction. The guide rods 522 on the front and rear sides are accommodated in the first guide portion second part 224 and the first auxiliary guide portion second part 274, respectively, thereby moving in a straight line in the first direction. The front and rear sides of the second end (i.e., the right end) of the guide member 516 are provided with forward and backward protruding points 524, respectively. The drive block 517 is generally in a "JL" shaped with the opening towards the left. In particular, the drive block 517 includes a drive block body and two feet disposed on both front and rear sides of the drive block body and formed from the drive block body extending towards the left. The two feet are located at the first end (i.e., the left end) of the drive block 517 and are respectively sleeved on the protruding points 524 from the front and rear sides of the second end (i.e., the right end) of the guide member 516, so that the drive block 517 is rotatably connected to the guide member 516. The drive block 517 is disposed between the first leg 141 and the third leg. A recess 526 is provided on the second end of the drive block 517. The rear side of the first leg 141 and the front side of the third leg of the cover 106 are respectively provided with a protrusion (not shown). The protrusion can be accommodated in the recess 526 such that the drive block 517 is rotatably connected to the cover 106. The first leg guide rod 151 and the third leg guide rod are provided at the front side of the first leg 141 and the rear side of the third leg, respectively. The drive block 517 and the rotation axis of the cover 106 are disposed coaxially with the first leg guide rod 151 and the third leg guide rod. That is, the drive block 517 and the rotation axis of the cover 106 are not accommodated in the first guide portion 214.

Figure 7A:
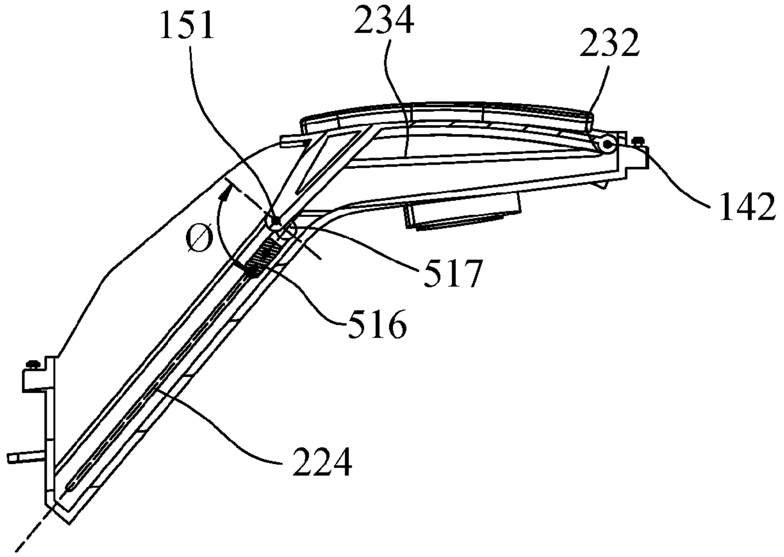
FIG. 7A is a cross-sectional view of the cover assembly shown in FIG. 5A with the cover in a closed position and a door plate not shown.
Figure 7B:
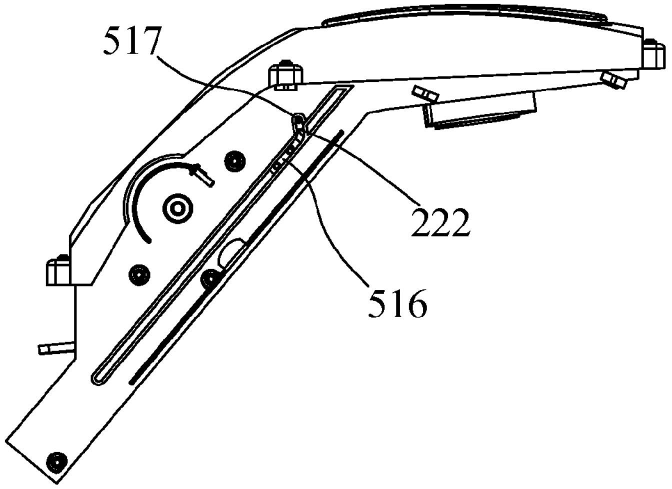
FIG. 7B is a side view of the cover assembly shown in FIG. 5A with the cover in a closed position and the door plate is not shown.

FIG. 7A is a cross-sectional view of the cover assembly 500 shown in FIG. 5A with the cover 106 in the closed position and the door plate 101 not shown. FIG. 7B is a side view of the cover assembly 500 shown in FIG. 5A with the cover 106 in the closed position and the door plate 101 not shown. As shown in FIGS. 7A-7B, when the cover 106 is in the closed position, the cover 106 closes the door plate opening 103, the front and rear ends of the first leg guide rod 151 (i.e., the second end of the drive block 517) are located at the uppermost end of the first guide portion 214 and the first auxiliary guide portion 244, respectively (i.e., the uppermost end of the first guide portion first part 222 and the first auxiliary guide portion first part 272), and the front and rear ends of the first end of the guide member 516 are located in the first guide portion second part 224 and the first auxiliary guide portion second part 274, respectively. The second and fourth legs 142, 144 are located at the right-most end of the second guide portion 216 (i.e., the right-most end of the second guide portion first part 232) and the right-most end of the second auxiliary guide portion 246 (i.e., the right-most end of the second auxiliary guide portion first part 282), respectively. Furthermore, when the cover 106 is in the closed position, the range of the angle φ between the length direction of the drive block 116 and the first direction is: $80° < φ \leq 105°$.

Figure 8A:
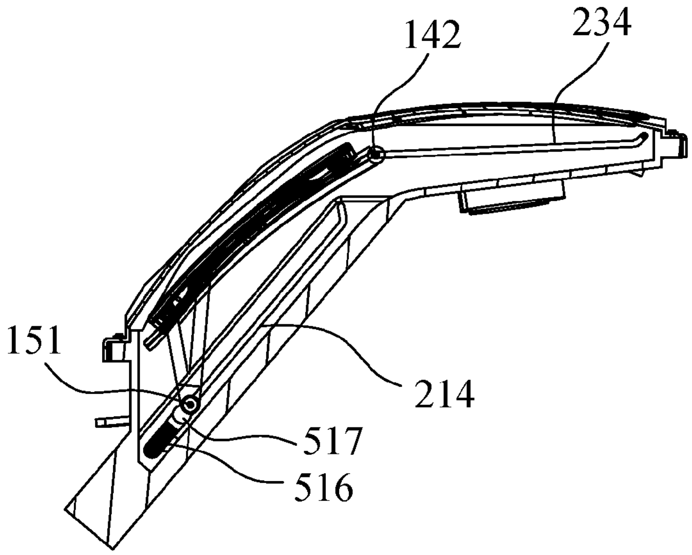
FIG. 8A is a cross-sectional view of the cover assembly shown in FIG. 5A with the cover in an open position and the door plate not shown.
Figure 8B:
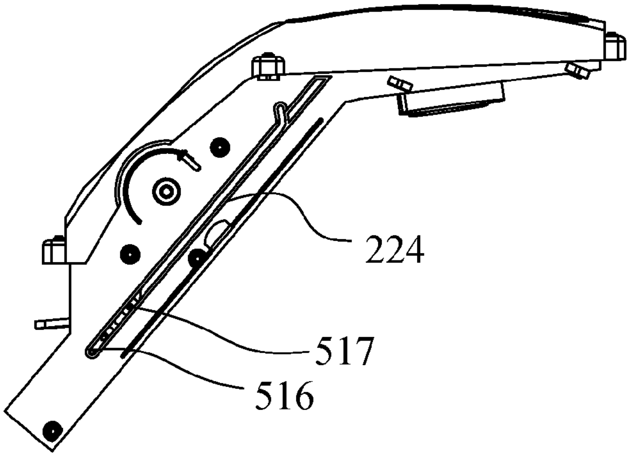
FIG. 8B is a cross-sectional view of the cover assembly shown in FIG. 5A with the cover in an open position and the door plate not shown.

FIG. 8A is a cross-sectional view of the cover assembly 500 shown in FIG. 5A with the cover 106 in an open position and the door plate 101 not shown. FIG. 8B is a perspective view of the cover assembly 500 shown in FIG. 5A with the cover 106 in an open position and the door plate 101 not shown. When the cover 106 is in the open position, the cover 106 exposes the door plate opening 103, with the front and rear ends of the first leg guide rod 151 (i.e., the second end of the drive block 517), and the front and rear ends of the first end of the guide member 516 being located in the first guide portion second part 224 and the first auxiliary guide portion second part 274, respectively, and at the bottom. The second and fourth legs 142, 144 are located at the left-most end of the second guide portion 216 (i.e., the left-most end of the second guide portion first part 232) and the left-most end of the second auxiliary guide portion 246 (i.e., the left-most end of the second auxiliary guide portion first part 282), respectively. The drive block 517 and the rotation axis of the cover 106 (i.e., the second end of the guide member 516 and the first end of the drive block 517) are located in a straight line where the first guide portion second part 224 is located, but are not accommodated in the first guide portion second part 224. The second leg 142 is located at the left-most end of the second guide portion 216 (i.e., the left-most end of the second guide portion second part 234).

The process of the cover 106 moving from the closed position to the open position is described below with reference to FIGS. 7A-7B and FIGS. 8A-8B:

As shown in FIGS. 7A-7B, the cover 106 is in the closed position. When the driver needs to open the cover 106, the driver may drive the drive apparatus, thereby driving both front and rear ends of the first end of the guide member 516 to move downward in the first guide portion 214 in the first direction. The guide member 516 drives the drive block 517 so that the drive block 517 rotates relative to the guide member 516. At the same time, the drive block 517 also rotates relative to the cover 106 and drives the first end of the cover 106 to move downward. Specifically, the first leg guide rod 151 and the third leg guide rod of the cover 106 move downward in the first guide portion first part 222 and the first auxiliary guide portion first part 272, respectively, causing the first end of the cover 106 to move downward away from the door plate opening 103. As the first end of the cover 106 moves downward away from the door plate opening 103, the second end of the cover 106 is also driven to move obliquely downward away from the door plate opening 103. Specifically, the second leg 142 and the fourth leg 144 of the cover 106 move downward in the second guide portion first part 232 and the second auxiliary guide portion first part 282, respectively. Then, during the process of the guide member 516 moving in the first direction, the first leg guide rod 151 of the cover 106 enters the first guide portion second part 224 from the first guide portion first part 222 and moves downward in the first guide portion second part 224 in the first direction, and the third leg guide rod enters the first auxiliary guide portion second part 274 from the first auxiliary guide portion first part 272 and moves downward in the first auxiliary guide portion second part 274 in the first direction. Movement of the first leg guide rod 151 and the third leg guide rod drives the second leg 142 of the cover 106 to enter from the second guide portion first part 232 into the second guide portion second part 234 and move left in the second guide portion second part 234, and drives the fourth leg 144 of the cover 106 to enter from the second auxiliary guide portion first part 282 into the second auxiliary guide portion second part 284 and move left in the second auxiliary guide portion second part 284. As such, the first end of the cover 106 exits the door plate opening 103 first and the second end of the cover 106 exits the door plate opening 103. Finally, the cover 106 moves to the open position, exposing the door plate opening 103. In this case, the front and rear ends of the first leg guide rod 151 (i.e., the second end of the drive block 517), the front and rear ends of the first end of the guide member 516 are located in the first guide portion second part 224 and the first auxiliary guide portion second part 274, respectively, and are located at the bottom. The second and fourth legs 142, 144 are located at the left-most end of the second guide portion 216 (i.e., the left-most end of the second guide portion first part 232) and the left-most end of the second auxiliary guide portion 246 (i.e., the left-most end of the second auxiliary guide portion first part 282), respectively.

The movement of the cover 106 from the open position to the closed position is opposite to the process described above from the closed position to the open position, which is not repeated here.

As compared to the cover assembly 100 of the first example of the present application, the cover assembly 500 of the second example of the present application only needs to be configured with one pair of guide portions (i.e., the first guide portion 214 and the first auxiliary guide portion 244) to guide the movement of the first end of the cover 106, and realize the technical effect that "the cover 106 may be held in the closed position under the action of an external force, which does not require an additional locking apparatus to implement self-locking".

Figure 9A:
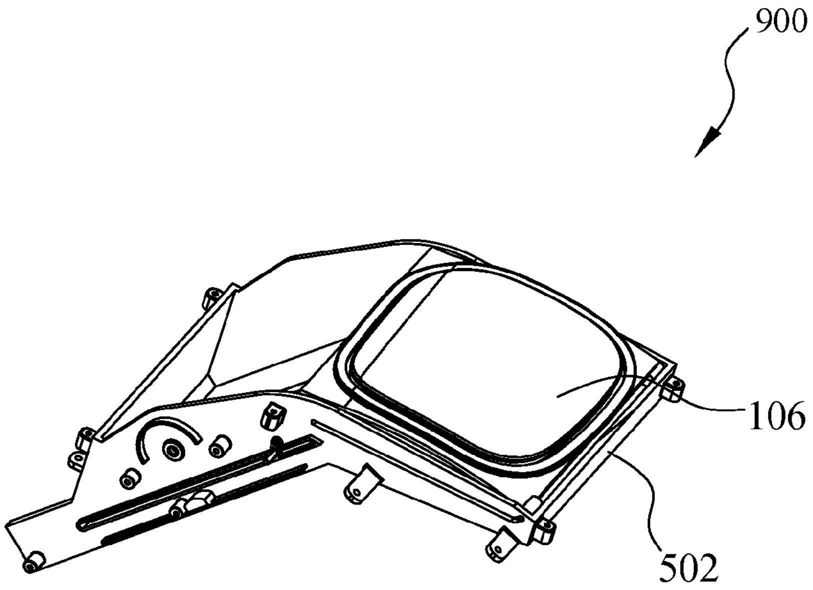
FIG. 9A is a perspective view of a cover assembly of a third example of the present application.
Figure 9B:
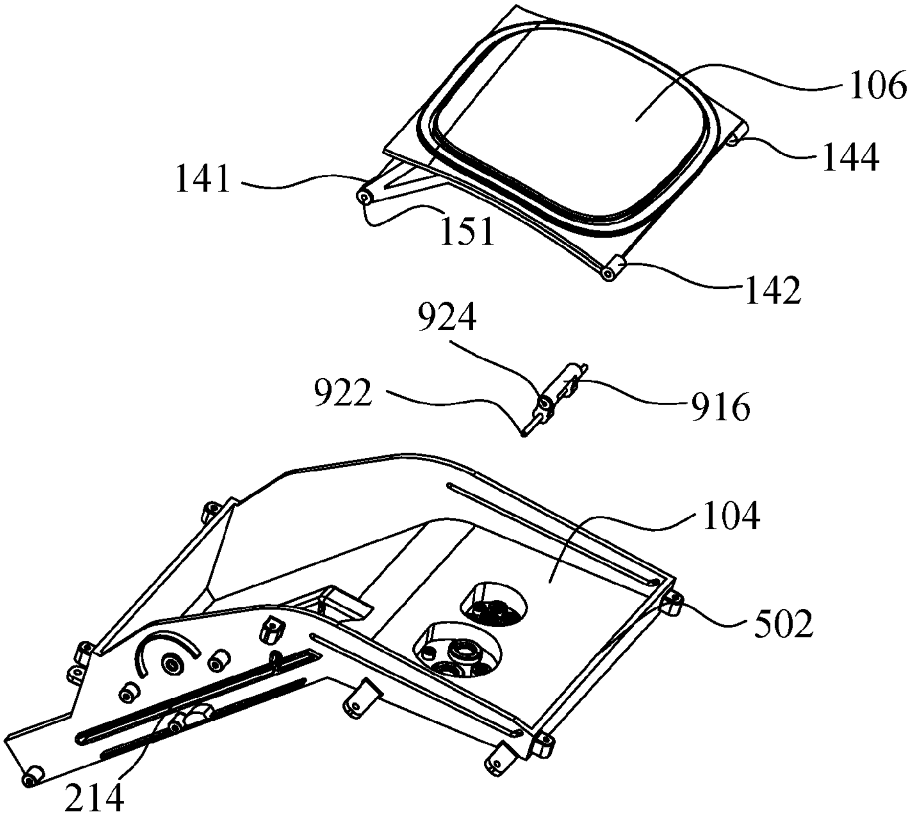
FIG. 9B is an exploded view of the cover assembly shown in FIG. 9A.
Figure 10:
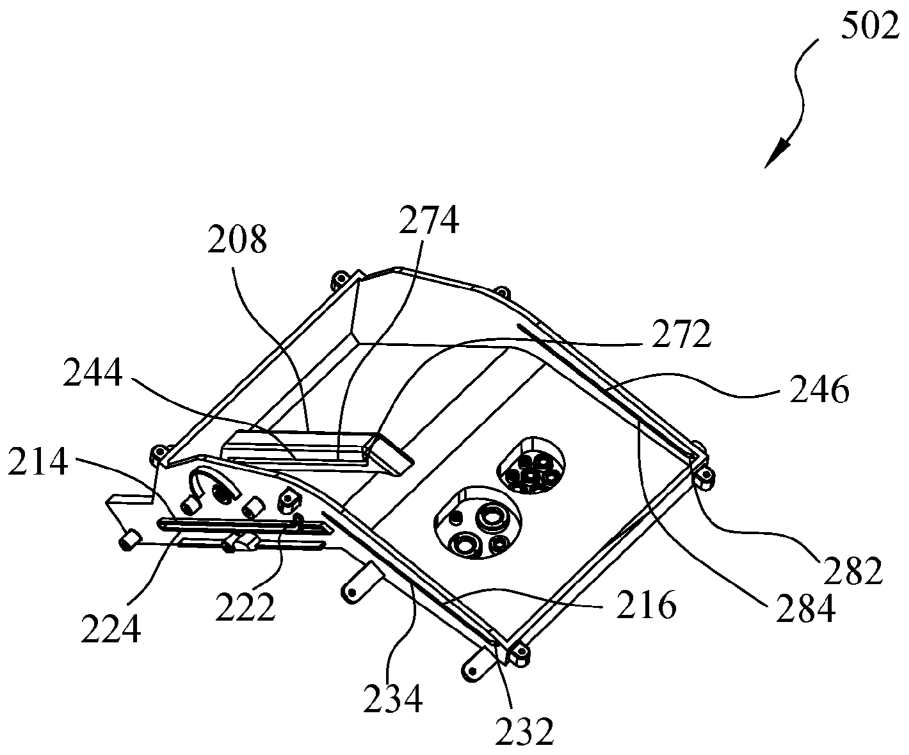
FIG. 10 is a perspective view of a housing shown in FIG. 9A.

FIGS. 9A-12B illustrate a cover assembly 900 of a third example of the present application. FIG. 9A is a perspective view of the cover assembly 900 of the present application, and FIG. 9B is an exploded view of the cover assembly 900 shown in FIG. 9A. FIG. 10 is a perspective view of a housing 502 shown in FIG. 9A. The main difference between the cover assembly 900 and the cover assembly 500 is: The drive assembly in the cover assembly 500 includes a drive block 916. For the sake of brevity, the components in the cover assembly 900 are not described in the same parts as the components in the cover assembly 500, and the same components use the same names and reference numerals.

As shown in FIGS. 9A-9B, the drive assembly includes a drive block 916. The drive block 916 is disposed between the first leg 141 and the third leg and is rotatably connected to the first leg 141 and the third leg. In particular, the drive block 916 has a first end (i.e., a lower end) and a second end (i.e., an upper end). The front side and the rear side of the first end of the drive block 916 are respectively provided with guide rods 922 formed extending in the front-to-back direction, which are respectively accommodated in the first guide portion 214 and the first auxiliary guide portion 244. The front and rear sides of the second end of the drive block 916 are provided with forward and backward protruding points 924, respectively. The rear side of the first leg 141 and the front side of the third leg of the cover 106 are respectively provided with recesses (not shown) for accommodating the protruding points 924, respectively, so that the drive block 916 is rotatably connected to the cover 106. The first leg guide rod 151 and the third leg guide rod are provided at the front side of the first leg 141 and the rear side of the third leg, respectively. The drive block 916 and the rotation axis of the cover 106 are disposed coaxially with the first leg guide rod 151 and the third leg guide rod. That is, the drive block 916 and the rotation axis of the cover 106 are accommodated in the first guide portion 214.

Figure 11A:
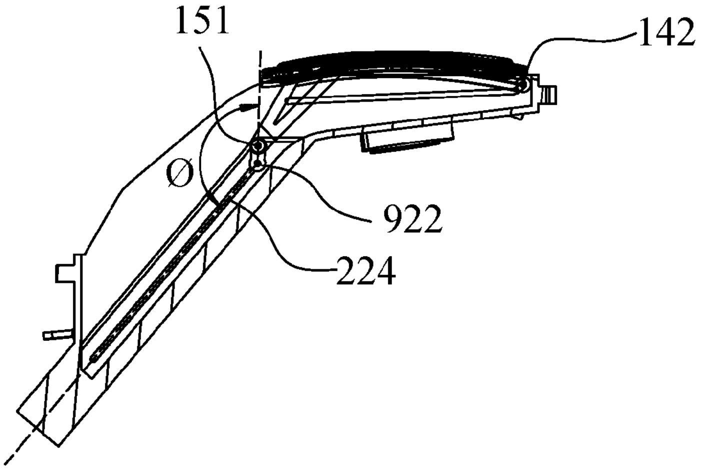
FIG. 11A is a cross-sectional view of the cover assembly shown in FIG. 9A with the cover in a closed position and a door plate not shown.
Figure 11B:
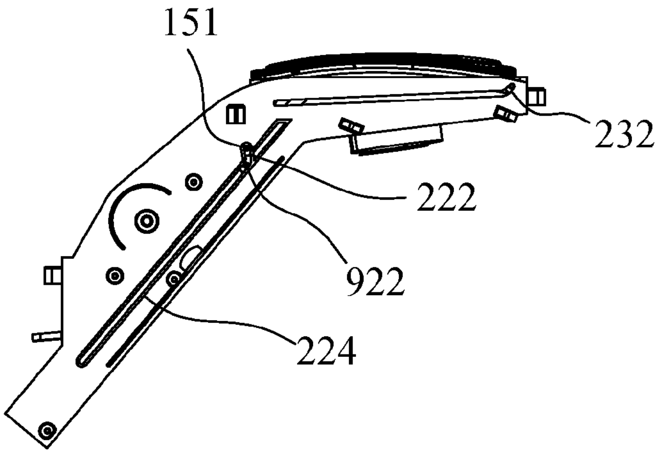
FIG. 11B is a cross-sectional view of the cover assembly shown in FIG. 9A with the cover in a closed position and the door plate not shown.

FIG. 11A is a cross-sectional view of the cover assembly 900 shown in FIG. 9A with the cover 106 in the closed position and the door plate 101 not shown. FIG. 11B is a side view of the cover assembly 900 shown in FIG. 9A with the cover 106 in the closed position and the door plate 101 not shown. As shown in FIGS. 11A-11B, when the cover 106 is in the closed position, the cover 106 closes the door plate opening 103 and the front and rear ends of the first end (i.e., the guide rod 922) of the drive block 916 are located at the uppermost end of the first guide portion second part 224 and the first auxiliary guide portion second part 244, respectively. The front and rear ends of the second end of the drive block 916 (i.e., the first leg guide rod 151) are located at the uppermost end of the first guide portion 214 and the first auxiliary guide portion 244, respectively (i.e., the uppermost end of the first guide portion first part 222 and the first auxiliary guide portion first part 272). The second and fourth legs 142, 144 are located at the right-most end of the second guide portion 216 (i.e., the right-most end of the second guide portion first part 232) and the right-most end of the second auxiliary guide portion 246 (i.e., the right-most end of the second auxiliary guide portion first part 282), respectively. Furthermore, when the cover 106 is in the closed position, the range of the angle φ between the length direction of the drive block 116 and the first direction is: 105°<Φ<<160°.

Figure 12A:
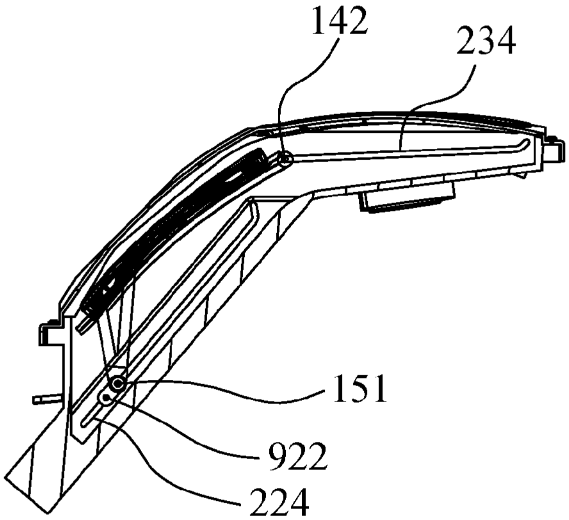
FIG. 12A is a cross-sectional view of the cover assembly shown in FIG. 9A with the cover in an open position and the door plate not shown.
Figure 12B:
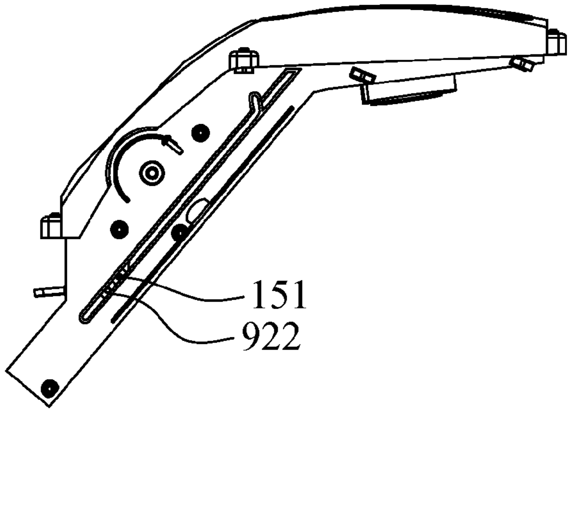
FIG. 12B is a cross-sectional view of the cover assembly shown in FIG. 9A with the cover in the open position and the door plate not shown.

FIG. 12A is a cross-sectional view of the cover assembly 900 shown in FIG. 9A with the cover 106 in the open position and the door plate 101 not shown. FIG. 12B is a perspective view of the cover assembly 900 shown in FIG. 9A with the cover 106 in the open position and the door plate 101 not shown. When the cover 106 is in the open position, the cover 106 exposes the door plate opening 103, both front and rear ends of the first end of the drive block 916 (i.e., the guide rod 922) and both front and rear ends of the second end of the drive block 916 (i.e., the first leg guide rod 151) are located in the first guide portion second part 224 and the first auxiliary guide portion second part 244, respectively, and are located at the bottom. The second and fourth legs 142, 144 are located at the left-most end of the second guide portion 216 (i.e., the left-most end of the second guide portion first part 232) and the left-most end of the second auxiliary guide portion 246 (i.e., the left-most end of the second auxiliary guide portion first part 282), respectively. The drive block 916 and the rotation axis of the cover 106 (i.e., the second end of the guide member 516 and the first end of the drive block 916) are located in a straight line where the first guide portion second part 224 is located, but are not accommodated in the first guide portion second part 224. The second leg 142 is located at the left-most end of the second guide portion 216 (i.e., the left-most end of the second guide portion second part 234).

The process of the cover moving 106 from the closed position to the open position is described below with reference to FIGS. 11A-11B and 12A-12B:

As shown in FIGS. 11A-11B, the cover 106 is in the closed position. When the driver needs to open the cover 106, the driver may drive the drive apparatus, thereby driving the front and rear ends of the first end of the drive block 916 to move diagonally downward in the first guide portion 214 and the first auxiliary guide portion 244 in the first direction, respectively. The drive block 916 rotates about the guide rod 922 and drives the first end of the cover 106 to move downward. Specifically, the first leg guide rod 151 and the third leg guide rod of the cover 106 move downward in the first guide portion first part 222 and the first auxiliary guide portion first part 272, respectively, causing the first end of the cover 106 to move downward away from the door plate opening 103. As the first end of the cover 106 moves downward away from the door plate opening 103, the second end of the cover 106 is also driven to move obliquely downward away from the door plate opening 103. Specifically, the second leg 142 and the fourth leg 144 of the cover 106 move downward in the second guide portion first part 232 and the second auxiliary guide portion first part 282, respectively. Then, during the process of the first end of the drive block 916 continuing to move in the first direction, the first leg guide rod 151 of the cover 106 enters the first guide portion second part 224 from the first guide portion first part 222 and moves downward in the first guide portion second part 224 in the first direction, and the third leg guide rod enters the first auxiliary guide portion second part 244 from the first auxiliary guide portion first part 272 and moves downward in the first auxiliary guide portion second part 244 in the first direction. Movement of the first leg guide rod 151 and the third leg guide rod drives the second leg 142 of the cover 106 to enter from the second guide portion first part 232 into the second guide portion second part 234 and move left in the second guide portion second part 234, and drives the fourth leg 144 of the cover 106 to enter from the second auxiliary guide portion first part 282 into the second auxiliary guide portion second part 284 and move left in the second auxiliary guide portion second part 284. As such, the first end of the cover 106 exits the door plate opening 103 first and the second end of the cover 106 exits the door plate opening 103. Finally, the cover 106 moves to the open position, exposing the door plate opening 103. In this case, the first and second ends of the drive block 916 are located in the first guide portion second part 224 and the first auxiliary guide portion second part 244, respectively, and are located at the bottom. The second and fourth legs 142, 144 are located at the left-most end of the second guide portion 216 (i.e., the left-most end of the second guide portion first part 232) and the left-most end of the second auxiliary guide portion 246 (i.e., the left-most end of the second auxiliary guide portion first part 282), respectively.

The movement of the cover 106 from the open position to the closed position is opposite to the process described above from the closed position to the open position, which is not repeated here.

For an electric vehicle, the vehicle needs to be charged when the vehicle loses power. If a customer requests that the cover 106 be opened using a smaller force, the φ angle may be set to be larger and tend to be 160°, or the friction and/or the resistance inside the drive apparatus may be set to be smaller, so that when the cover 106 is in the closed position, the component force of the external force in the first direction is larger, which is consistent with the movement direction of the drive apparatus, thereby enabling the cover 106 to move from the closed position to the open position under the action of the external force. Conversely, if the customer requires a greater force to open the cover 106, the φ angle may be set to be smaller and tend to be 105°, or the friction and/or the resistance inside the drive apparatus may be set to be greater, so that when the cover 106 is in the closed position, the component force of the external force perpendicular to the first direction is greater, thereby achieving that the cover 106 needs to move from the closed position to the open position (i.e., emergency opening) under the action of a greater external force.

As such, the present application provides a cover assembly in which the first end (i.e., the left end) of the drive assembly linearly moves in the first direction, and the second end (i.e., the right end) of the drive assembly is rotatably connected to the first end of the cover 106, thereby driving the movement of the cover 106. The first guide portion and the second guide portion on the housing can guide the drive assembly to drive the movement of the cover 106, so that the cover assembly of the present application has the advantage of achieving the opening or keeping the cover 106 closed according to the requirements of different holding forces of the customer.

It should be added that, since different materials have different coefficients of friction, the critical value of the angle setting in the above examples can be changed by selecting different materials, which is easy to think of. Therefore, the scope of the above angle setting is to clarify the principles of the present disclosure, and any same or equivalent alternatives that use the principles of the above examples are within the scope of protection of the present disclosure.

Although the present disclosure has been described in connection with examples of the examples outlined above, various alternatives, modifications, variations, improvements, and/or substantial equivalents, whether known or foreseeable now or in the near future, may be apparent to those having at least ordinary skill in the art. In addition, the technical effects and/or technical problems described in the present specification are exemplary and not limiting: therefore, the disclosure in the present specification may be used to solve other technical problems and have other technical effects and/or may solve other technical problems. Therefore, examples of the present disclosure as set forth above are intended to be illustrative and not limiting. Various changes may be made without departing from the spirit or scope of the present disclosure. Therefore, the present disclosure is intended to include all known or earlier developed alternatives, modifications, variations, improvements and/or substantial equivalents.

What is claimed is:

1. A cover assembly, comprising:

a housing having an accommodation space;

a cover movable relative to the housing and having a closed position and an open position, the cover closing a door plate opening on a door plate when the cover is in the closed position, and when the cover is in the open position, the cover being accommodated in the accommodation space and exposing the door plate opening; and a drive assembly, a first end of the drive assembly being linearly movable in a first direction, a second end of the drive assembly being rotatably connected to a first end of the cover;

wherein the housing defines a first guide portion and a second guide portion, a first end of the cover being movable along the first guide portion, and a second end of the cover being movable along the second guide portion, and wherein during rotation of the drive assembly about the second end of the drive assembly such that the cover moves from the closed position to the open position, the drive assembly is configured to enable the first end of the cover to move downward relative to the second end of the cover, so that the first end of the cover first exits the door plate opening, and then the second end of the cover exits the door plate opening.

2. The cover assembly according to claim 1, wherein:

the drive assembly comprises a drive block, a first end of the drive block being the first end of the drive assembly, and the second end of the drive block being the second end of the drive assembly; and the housing further defines a drive guide portion extending in the first direction;

wherein the first end of the drive block is accommodated in the drive guide portion, and the second end of the drive block is accommodated in the first guide portion.

3. The cover assembly according to claim 2, wherein:

the first guide portion comprises a first guide portion first part and a first guide portion second part in communication;

the first guide portion first part is configured to: as the cover moves from the closed position to the open position, enable the second end of the drive block to move downward in the first guide portion first part, so that the first end of the cover moves away from the door plate opening; and the first guide portion second part is disposed in the first direction.

4. The cover assembly according to claim 3, wherein:

the drive guide portion is disposed above the first guide portion second part and is disposed at a distance in a height direction from the first guide portion second part.

5. The cover assembly according to claim 1, wherein:

the drive assembly comprises a drive block and a guide member, a first end of the guide member is the first end of the drive assembly, a second end of the guide member is rotatably connected to a first end of the drive block, and a second end of the drive block is the second end of the drive assembly; and the first end of the guide member is accommodated in the first guide portion, and the guide member is movable in the first direction.

6. The cover assembly according to claim 5, wherein:

the second end of the guide member and the first end of the drive block are not accommodated in the first guide portion.

7. The cover assembly according to claim 5, wherein:

the cover assembly is configured to: when the cover is in the closed position, enable the range of an angle $\varphi$ between a length direction of the drive block and the first direction to be: $80^\circ < \varphi \leq 105^\circ$.

8. The cover assembly according to claim 1, wherein:

the drive assembly comprises a drive block, a first end of the drive block being the first end of the drive assembly, and the second end of the drive block being the second end of the drive assembly;

wherein the first end of the drive block is accommodated in the first guide portion.

9. The cover assembly according to claim 8, wherein: the cover assembly is configured to: when the cover is in the closed position, enable the range of an angle $\varphi$ between a length direction of the drive block and the first direction to be: $105^\circ < \varphi < 160^\circ$.

10. A cover assembly, comprising:

a housing having an accommodation space;

a cover movable relative to the housing and having a closed position and an open position, the cover closing a door plate opening on a door plate when the cover is in the closed position, and when the cover is in the open position, the cover being accommodated in the accommodation space and exposing the door plate opening; and a drive assembly comprising a drive block, a first end of the drive block being linearly movable in a first direction, and a second end of the drive block being rotatably connected to a first end of the cover, wherein the housing defines a first guide portion, a second guide portion, and a drive guide portion extending in the first direction, the first end of the drive block being accommodated in the drive guide portion, the second end of the drive block being accommodated in the first guide portion, a first end of the cover being movable along the first guide portion, and a second end of the cover being movable along the second guide portion.

11. The cover assembly according to claim 10, wherein the drive assembly is configured to, during rotation of the drive assembly about the second end of the drive block such that the cover moves from the closed position to the open position, enable the first end of the cover to move downward relative to the second end of the cover so that the first end of the cover first exits the door plate opening and then the second end of the cover exits the door plate opening.

12. The cover assembly according to claim 10, wherein: the first guide portion comprises a first guide portion first part and a first guide portion second part in communication; the first guide portion first part is configured to, as the cover moves from the closed position to the open position, enable the second end of the drive block to move downward in the first guide portion first part so that the first end of the cover moves away from the door plate opening; and the first guide portion second part is disposed extending in the first direction.

13. The cover assembly according to claim 12, wherein the drive guide portion is disposed above the first guide portion second part and at a distance from the first guide portion second part in a height direction.

14. The cover assembly according to claim 10, wherein the cover assembly is configured to, when the cover is in the closed position, enable the range of an angle $\varphi$ between a length direction of the drive block and the first direction to be: $80^\circ < @ \leq 105^\circ$.

15. A cover assembly, comprising:

a housing having an accommodation space;

a cover movable relative to the housing and having a closed position and an open position, the cover closing a door plate opening on a door plate when the cover is in the closed position, and when the cover is in the open position, the cover being accommodated in the accommodation space and exposing the door plate opening; and a drive assembly comprising a drive block and a guide member, a first end of the guide member being linearly movable in a first direction and accommodated in a first guide portion defined by the housing, a second end of the guide member being rotatably connected to a first end of the drive block, and a second end of the drive block being rotatably connected to a first end of the cover, wherein the housing further defines a second guide portion, a first end of the cover being movable along the first guide portion, and a second end of the cover being movable along the second guide portion; and wherein the guide member is movable in the first direction.

16. The cover assembly according to claim 15, wherein the drive assembly is configured to, during rotation of the drive assembly about the second end of the drive block such that the cover moves from the closed position to the open position, enable the first end of the cover to move downward relative to the second end of the cover so that the first end of the cover first exits the door plate opening and then the second end of the cover exits the door plate opening.

17. The cover assembly according to claim 15, wherein the second end of the guide member and the first end of the drive block are not accommodated in the first guide portion.

18. The cover assembly according to claim 15, wherein the cover assembly is configured to, when the cover is in the closed position, enable the range of an angle φ between a length direction of the drive block and the first direction to be: $80° < \varphi \leq 105°$.

19. The cover assembly according to claim 15, wherein: the first guide portion comprises a first guide portion first part and a first guide portion second part in communication; the first guide portion first part is configured to, as the cover moves from the closed position to the open position, enable the first end of the cover to move away from the door plate opening; and the first guide portion second part is disposed extending in the first direction.

* * * * *